(12) United States Patent
Shousterman et al.

(10) Patent No.: US 7,903,540 B2
(45) Date of Patent: Mar. 8, 2011

(54) METHOD AND DEVICE FOR SYNCHRONIZATION IN WIRELESS NETWORKS

(75) Inventors: Leonid Shousterman, Herzlia (IL); Oleg Marinchenco, Modein (IL); Mark Altshuler, Ganot Hadar (IL); Nadav Lavi, Rishon-LeZion (IL)

(73) Assignee: Alvarion Ltd., Tel-Aviv (IL)

( * ) Notice: Subject to any disclaimer, the term of this patent is extended or adjusted under 35 U.S.C. 154(b) by 857 days.

(21) Appl. No.: 11/833,065

(22) Filed: Aug. 2, 2007

(65) Prior Publication Data
US 2009/0034459 A1 Feb. 5, 2009

(51) Int. Cl.
*H04J 3/06* (2006.01)
(52) U.S. Cl. .......... 370/216; 370/329; 370/350; 370/503
(58) Field of Classification Search .................. None
See application file for complete search history.

(56) References Cited

U.S. PATENT DOCUMENTS

| | | | |
|---|---|---|---|
| 2003/0031175 A1 | 2/2003 | Hayashi et al. | 370/390 |
| 2006/0239264 A1* | 10/2006 | Kang et al. | 370/390 |
| 2008/0008176 A1* | 1/2008 | Lim et al. | 370/390 |
| 2008/0298336 A1* | 12/2008 | Gollamudi | 370/343 |
| 2008/0311902 A1* | 12/2008 | Diepstraten et al. | 455/426.1 |

OTHER PUBLICATIONS

Alcatel Shanghai Bell, 3GPP TSG-RAN WG RAN3 #53, Tallinn, Estonia, Aug. 28-Sep. 2006, "L2 Content Transmission Synchronization for MBMS in LTE SFN", Documented for discussion and decision, R3-061008, XP-002470009.

Nokia, 3GPPTSG-RAN WG3 #53bis, Seoul, Korea, Oct. 10-13, 2006, "MBMS L2 Transmission Synchronization with Segmentation and Concatenation", Documented for discussion and decision, R3-061552, XP-002471975.

Alcatel Shanghai Bell, 3GPP TSG-RAN WG RAN1 #46, Tallinn, Estonia, Aug. 28-Sep. 2006, "Inter E-Node B Node Synchronization in LTE MBMS", Documented for discussion and decision, R1-061969.

* cited by examiner

*Primary Examiner* — Chi H. Pham
*Assistant Examiner* — Shick Hom
(74) *Attorney, Agent, or Firm* — Browdy and Neimark, PLLC

(57) ABSTRACT

A method and device are provided for synchronizing data transmission of multicasting/broadcasting services (MBS) by a plurality of Base Stations. The method disclosed includes providing synchronization information to enable the plurality of Base Stations to start transmitting MBS data at a synchronized starting time point. Meanwhile, each of the Base Stations receives the MBS data to be transmitted and determines whether any of the MBS data has not been properly received. If so, the respective Base Station initiates a process to recover the missing MBS data or to obtain within a pre-determined time interval, information regarding the missing data to determine the duration of the time period that would have been required for transmitting the missing MBS. If the missing data has not been timely recovered, the respective Base Station determines a starting point and duration of a silence period based on the information obtained, and refrains from transmitting signals along a communication channel allocated for transmission of MBS data, during that silence period.

15 Claims, 8 Drawing Sheets

METHOD AND DEVICE FOR SYNCHRONIZATION IN WIRELESS NETWORKS

FIELD OF THE INVENTION

The present invention relates to method and apparatus adapted to improve transmission efficiency in wireless communications systems, and more particularly in wireless communications networks that support multicast/broadcast services.

BACKGROUND OF THE INVENTION

Multicast/Broadcast Service ("MBS") in WiMAX Networks is a service that allows the distribution of data to a group of Mobile Subscribers ("MSs"). IEEE 802.16e standard introduces the notion of MBS_Zone—an area in which multiple Base Stations ("BSs") synchronously broadcast the same data over the same subchannels at the same time. This technique greatly improves the mobile terminals ability to receive data correctly due to increased energy of the combined signal that each mobile terminal received simultaneously from multiple Base Stations.

MBS Service-Flow ("SF") carries information to a set of MSs. Typically there are two methods to access a group of MSs for the provisioning of MBS:

Single-BS: Transmission of data over a single Base Station ("BS") in the network. The SF is mapped to a Connection Identifier ("CID") within a specific BS, i.e., the CID is uniquely specified on a "per BS basis".

Multi-BS: Transmission of data over a plurality of BSs in the network in a synchronized manner. The SF is mapped to a CID unique within a zone at which the service is provided, referred to hereinafter as an MBS_ZONE.

The establishment of an MBS connection is typically carried out in a way similar to the way by which unicast connections are established, while the MS registers to the network. This service, the MBS, is maintained regardless of the current mode of the MS (Normal/Sleep/Idle), so that MBS data is transmitted and received regardless of the MS current operation mode.

The Multi-BS access method enables an MS to receive the MBS content, after having successfully registered and the connection established, from several BSs. As explained above, this transmission method requires that the group of BSs participating in the same Multi-ES-MBS service to be synchronized so that data shall be transmitted by all these BSs simultaneously, and to use the same CID and Security Association ("SA"). It should be noted that the MS does not have to be registered at the specific BS from which it receives MBS transmissions.

An MBS_ZONE identifier is used to indicate the group of BSs which use the same CID and SA to distribute an MBS SF. MBS_ZONE can be advertised by the BS in DCD messages, also it can be delivered upon establishment of MBS connection and it can be extracted from the MAP_MBS_IE.

Obviously an MBS_ZONE may include one or more BSs, and a BS may have multiple MBS_ZONE identifiers.

In order to achieve the necessary level of synchronization and allow PHY diversity the downlink data should be identically mapped onto the airburst subchannel-time continuum, a coherent MBS_MAP should be created, and IEEE-802.16e Generic MAC headers, Fragmentation Subheaders, and Packing Subheaders should be applied identically across all the BSs that belong to the same MBS_Zone (see FIG. 1).

However, one of the major drawbacks of the currently known systems is the need to maintain synchronization of MBS downlink ("DL") flows between the BSs at a level that enables PHY diversity over WiMAX radio links, while the data itself is generated and conveyed along non-synchronized packet networks having high transmission jitter. Furthermore, as no synchronization-related information can be added to these packets, they cannot be used as a source for synchronization information.

One other problem associated with the implementation of the MBS-Zone concept, lies in the fact that each MBS_Zone should be synchronized independently of the other MBS_Zones. However, in case of overlapping MBS_Zones, i.e., a BS that is a member of several MBS_Zones, there is a problem of mutual interference (meaning transmission of different data over the same sub-channels at the same time) which must be avoided. On the other hand, if two Zones do not overlap, it would be beneficial to allow them to transmit different data over the same sub-channels at the same time in order to improve resources' utilization. Thus, a mechanism for assigning time and subcarrier regions for each MBS Zone is required, where such a mechanism takes into account the geographical distribution of the zones, together with the presence or absence of actual data for transmission. The importance of the latter is because when a certain zone has no data to transmit at a certain given time, it will not produce interference and its resources (time and sub-channels) can be reused.

SUMMARY OF THE INVENTION

It is an object of the present invention to provide a method and apparatus that allow efficient utilization of the bandwidth available in wireless networks.

It is another object of the present invention to enable efficient multicast synchronization across arbitrary large MBS zones, preferably by maintaining separation between the radio and networking intelligences.

It is yet another object of the present invention to provide a method and device for synchronization of MBS DL flows between BSs to enable PHY diversity over WiMAX radio links.

It is still another object of the present invention to allow efficient multicast synchronization between overlapping MBS Zones.

Other objects of the invention will become apparent as the description of the invention proceeds.

Thus, in accordance with the present invention there is provided in a wireless communications network comprising a plurality of Base Stations each operative to provide MBS to mobile subscribers, a method for synchronizing the provisioning of MBS data by the plurality of Base Stations comprising the steps of:

(i) providing a first pre-determined time interval;
(ii) providing synchronization information to enable all of the plurality of Base Stations to start transmitting MBS data at a synchronized starting time point;

at each of the plurality of Base Stations:

(iii) receiving MBS data to be transmitted by all of the plurality of Base Stations;
(iv) determining whether any of the MBS data has not been properly received (e.g. not missing, corrupted, etc.), and upon determining the existence of such faulty MBS data (i.e. that has not been properly received), initiating by the respective one or more Base Stations a process to recover the faulty MBS data or to obtain within the first time interval information regarding the faulty data for use in determining the duration of a time period that would have been required for transmission of the faulty MBS data;

(v) for any of the respective one or more Base Stations that has not recovered the faulty MBS, determining a starting point of a silence period which would proceed the data that has been properly received at the respective Base Station and the duration of said silence period based on the information obtained by that respective Base Station;

(vi) transmitting available MBS data, starting at the synchronized starting time point and for the duration of a pre-determined second time interval, and wherein each of the respective one or more Base Stations that has not recovered the faulty MBS data shall refrain during said silence period from transmitting any signals along a communication channel allocated for transmission of MBS data.

By a preferred embodiment of the invention the duration of the first pre-determined time interval is equal substantially to twice the duration of the second time interval. According to another preferred embodiment of the invention, steps (iii) to (vi) are repeated every interval of time that is equal to three times the duration of the second time interval.

In accordance with another preferred embodiment of the invention, steps (ii) to (vi) are repeated after receiving synchronization information from a network synchronization/scheduling means.

By yet another preferred embodiment, the synchronization information comprises at least one of the following:
  Global multicast flow identification for identifying a respective multicast flow;
  Timestamp indicating the start of the $T_1$ interval; and
  Sequence numbers of the first and last packets received during the first pre-determined time interval;

According to another embodiment, in addition to the above, the synchronization information for non-homogenous scheduling further comprises information that relates to at least one of the following:
  allocation of the MBS Bursts across the air frames of the transmission period;
  Order of bursts;
  Information allowing the BSs to build identical PDUs (e.g., fragmentation, packing, first FSN, etc.).

According to still another preferred embodiment of the invention, the process in step (iv) to recover the faulty MBS data or to obtain information about the time period required for transmission of that faulty MBS data, comprises the steps of:

(a) sending by each of the respective one or more Base Stations a corresponding recovery request message to a distributing gateway which comprises identification of the respective multicast flow and a list of sequence numbers of faulty packets;

(b) receiving from the distributing gateway a recovery response message comprising identification of the respective multicast flow and a list of sequence numbers of the faulty packets together with information relating to their corresponding lengths.

In addition, the recovery response message may further comprise information relating to the data included in one or more of the faulty packets.

By yet another preferred embodiment of the invention, step (vi) is synchronized with a paging period of respective mobile subscribers so that their mobile terminals can avoid waking up twice, once to receive MBS data and the other time to receive paged data, during two different time intervals.

According to another preferred embodiment of the invention, the wireless communications network comprises a plurality of MBS zones, each comprising at least one Base Station, wherein at least two of the MBS zones geographically overlap each other, and wherein the method provided further comprises a step of synchronizing all MBS zones that have no overlapping between each other so that they may transmit their data over the same subcarriers at the same time.

Optionally, the step of synchronizing all MBS zones is carried out dynamically so that after each first interval period, the network resources are re-assigned and distributed among all Base Stations that belong to the corresponding MBS zones.

In accordance with another aspect of the invention there is provide a synchronization device adapted to operate in a wireless communications network comprising a plurality of Base Stations each operative to provide MBS to mobile subscribers, comprising:
  a clock synchronized with clocks of the plurality of Base Stations;
  a processor adapted to carry out one or more scheduling algorithms and optionally burst construction logic;
  a receiver adapted to receive MBS data;
  a buffer operative to store MBS data received; and
  a transmitter operative to transmit synchronization information to the plurality of Base Stations.

Preferably, the synchronization information comprises at least one of the following:
  Global multicast flow identification for identifying a respective multicast flow;
  Timestamp indicating the start of a time interval during which MBS data shall be accumulated by the plurality of Base Stations and each of the Base Stations may conduct a recovery process in case some or all of the MBS data received thereby is missing; and
  Sequence numbers of the first and last packets received during that time interval.

Preferably, the synchronization information further comprises information that enables coherent construction and placement of bursts.

DETAILED DESCRIPTION OF PREFERRED EMBODIMENTS

A better understanding of the present invention is obtained when the following non-limiting detailed description is considered in conjunction with the following drawings.

For the sake of simplifying the embodiments described hereinafter, the following assumptions are used.
1. MBS is essentially a unidirectional service and thus is insensitive to delays. Some level of feedback could be associated with such a service (e.g. interactive TV) but there would be no adverse effect if the feedback is delayed for a couple of seconds or so. Thus the synchronization mechanism may introduce a few seconds of delay. The delay is recommended in order to compensate for the high transmission jitter that may occur in a WiMAX backhaul network.
2. The physical clocks of all Base Stations in the network are synchronized. The nature of synchronization is out of scope of this invention, and can be done in any one of the well-known techniques per se to synchronize the clocks across a network. For example GPS or IEEE 1588 may be used.
3. The nature of traffic is arbitrary so that the size of a data burst as well as time intervals between two consecutive bursts cannot be predicted.

Synchronization Process

Figure 1:
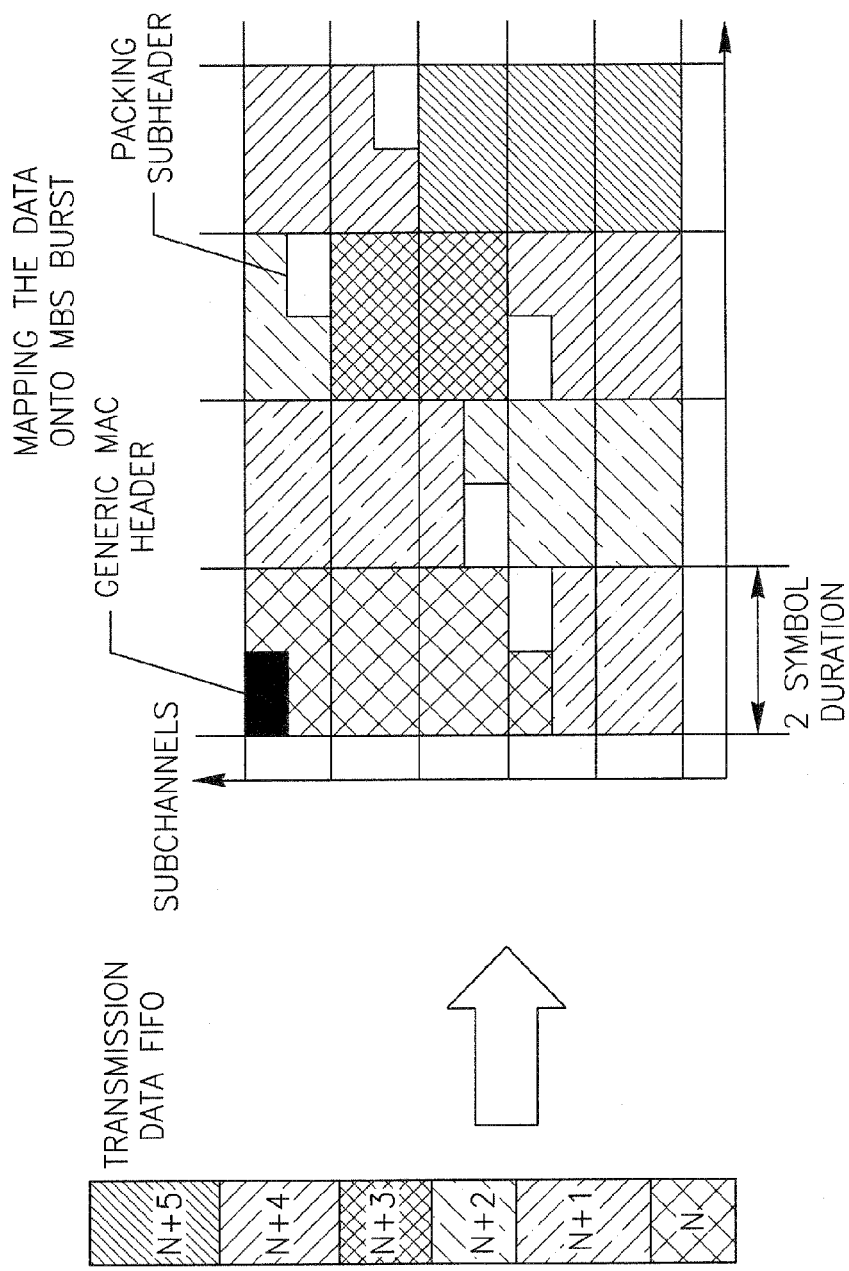
FIG. 1—Mapping MBS transmission buffer into an IEEE 802.16e MBS burst
Figure 2:
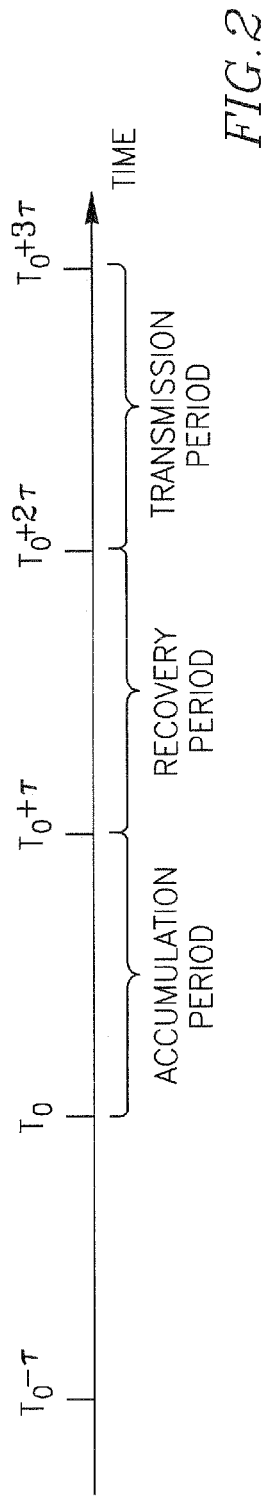
FIG. 2—presents a schematic view of synchronization periods according to an embodiment of the present invention.

The principles of synchronization are illustrated in FIG. 2, where the time axis is divided into periods having duration of $\tau$; while $\tau$ is a product of an integer multiplied by an airframe duration. Let $T_0$ represent the starting moment of a period of duration $\tau$. Then data that has been accumulated during the period extending from $T_0$ to $T_0+\tau$ (also referred to as accumulation period) will be transmitted during the period extending from $T_0+2\tau$ to $T_0+3\tau$ (also referred to as transmission period). During the period extending from $T_0+\tau$ to $T_0+2\tau$ (which is referred to as a recovery period) missing data (or at least the length of the missing data) must be recovered.

On the other hand, as the recovery and accumulation periods may overlap (due to the asynchronous nature of data distribution in the backhaul network) time can be regarded as comprising two main periods: distribution of data (e.g., accumulation and recovery) between $T_0$ to $T_0+2\tau$ and transmission between $T_0+2\tau$ to $T_0+3\tau$.

The recovery of missing data (or at least the length of the missing data) is essential because otherwise it will be rather difficult to ensure that all the BSs transmit the same data at the same time over the same subcarriers. If recovery of the missing data is impossible then at least the lengths must be recovered. In the latter case, where only the length of the missing data is available to the corresponding BS, it will transmit nothing in the relevant subcarriers at the time when the missing data should have been transmitted for a duration determined by the recovered length of the missing data.

Obviously this method introduces a delay up to $3\tau$. Preferably, the value of $\tau$ is substantially larger than the longest round trip delay expected in the network, in order to allow enough time for lost data recovery during the recovery period. So if the longest round trip delay in the network is about 100 msec, $\tau$ can be equal to 200 or 300 msec. In this case the delay introduced by the synchronization will reach 600 or 900 msec, respectively.

In addition, in order to increase the power-saving of MSs in Idle-Mode ("IM"), the transmission period may be synchronizes with the IM paging cycle. In this case, power will be saved as the MS will not be required to wake up and receive data during two different time intervals (MBS data transmission, and MOB_PAG-ADV transmission). In order to synchronize the paging cycle with the MBS distribution cycle, the following should preferably be satisfied: $\tau$ should be $\tau > 2$ frames and $\alpha \times 2\tau < \text{PAGING\_CYCLE} < \alpha \times 3\tau$ ($\alpha = 1, 2, 3, \ldots$).

The data distribution method is flexible and can support the Single-ES implementation. In this case an MBS zone would include a single BS, and would not require synchronization. Thus, $\tau$ can be set to zero and the BS be allowed to schedule transmission of data as soon as it is received.

Assigning Sequence Numbers to Multicast Packets

According to the WiMAX NWG Architecture the ASN GW communicates with BSs via R6 data and control plane protocols. This architectural framework is defined only for unicast traffic distribution. The unicast traffic is forwarded from the Anchor ASN GW to the corresponding Base Stations over GRE tunnels. The Anchor ASN GW classifies the user data and maps them onto the corresponding GRE keys. The BS then maps data tagged with a certain GRE key onto the corresponding IEEE 802.16e Connection.

Figure 3:
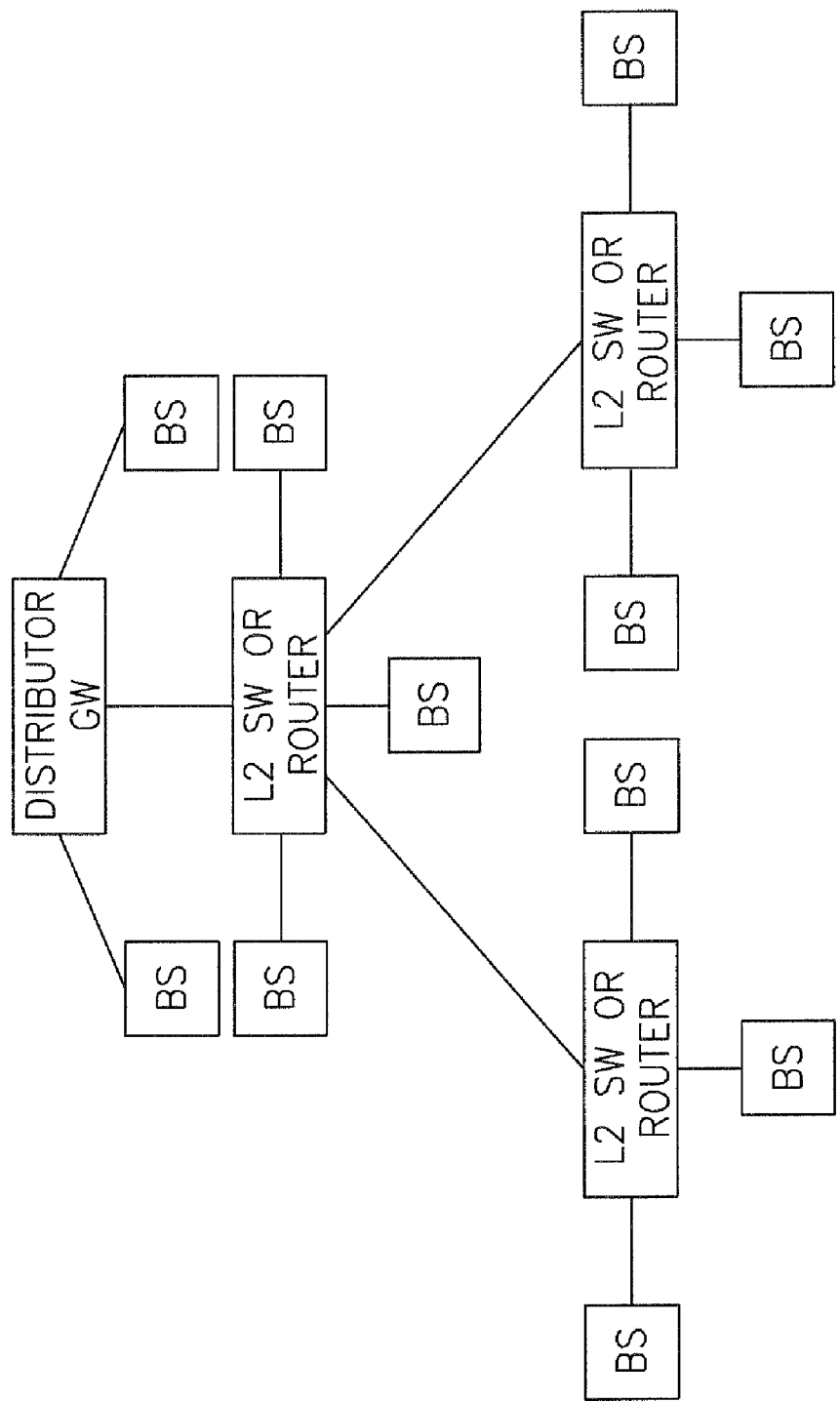
FIG. 3—presents a schematic illustration of a network architecture that includes a distributor gateway.

According to an embodiment of the present invention, the above-described architectural framework is reused by defining that the multicast data are distributed from the Distributor GW to the corresponding BSs over GRE tunnels. The architecture is shown in FIG. 3. The Distributor GW classifies the flows by Source and Destination addresses and maps the matching data onto corresponding GRE key. The GRE Tunnel may be per BS (unicast) or per group of BSs (multicast). The BS would then map each such GRE Tunnel onto M-Cast IEEE 802.16e connections.

In addition to classifying the multicast data and mapping them onto GRE tunnels, the Distributor GW assigns GRE sequence numbers to the data packets it forwards to the BS. The sequencing is carried out per GRE key, thus a GRE Key and a GRE Sequence Number uniquely identify the corresponding data packet.

The multicast routing infrastructure above the Distributor GWs may support Reliable Multicast Delivery mechanisms (e.g. PGM described in RFC 3208, SRMP described in RFC 4410, NORM described in RFC 3940, and the like). These protocols also deploy sequence numbering in one form or another which are assigned by the traffic source. These sequence numbers might be copied into the GRE Sequence Numbers of the corresponding data packets distributed from the Distributor GW to the BSs. Thus global synchronization of sequence numbers will be achieved within the entire multicast distribution tree rooted at a particular traffic source. Consequently, it becomes possible to deploy multiple Distributor GW across the same MBS zone as it is shown in FIG. 3.

Distributing Synchronization Info

Figure 4:
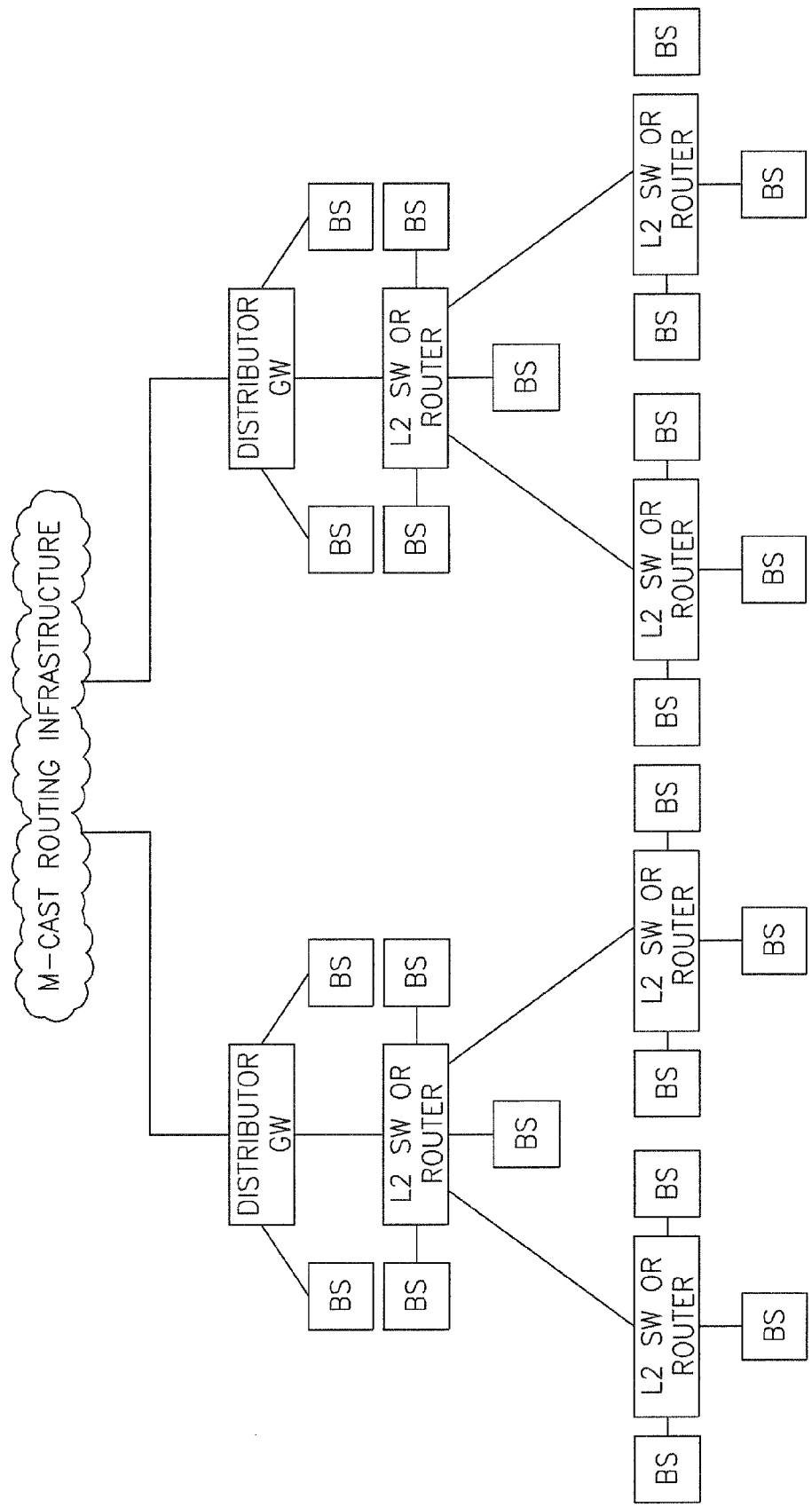
FIG. 4—shows a schematic illustration of network architecture with reliable multicast infrastructure.

Synchronization information is multicast to the entire set of the BSs in the MBS_Zone, every period of time having the duration of $\tau$, by a pre-determined entity in the network. This entity that generates synchronization information frames is referred to herein as a "Sync Node" (see FIG. 4). The Sync Node is preferably a Base Station, so that its clock is synchronized with the clocks of other BSs in the MBS zone, it runs BS scheduling algorithms, and receives the same data as does any other BS in the MBS_zone. It is not important if the Sync Node actually transmits the multicast data over the air or not, as the relevant role it performs in accordance with the present invention is as scheduler (synchronizer) and optionally as bursts constructor for the other Base Stations.

Each synchronization information ("Sync Info") packet preferably contains at least one of the following data, and more preferably a combination of them all:

Global Multicast Flow Identification. Uniquely identifies the multicast flow in the network. One of options for Global Multicast Flow ID may be for example, a set consisting of Multicast Destination IP Address and a list of Unicast Source IP Addresses, similar to the way by which a multicast group is represented in IP Routers.

Timestamp with granularity $\leq \tau$. The timestamp refers to the start of the accumulation period (as depicted in FIG. 2).

Sequence numbers of the first and last packets received during the accumulation period.

If all the Base Stations within the MBS_Zone run the same scheduling algorithms and have received or recovered all the packets the Sequence Numbers of which are specified in the Sync Info message, then the transmission may be synchronized across the entire MBS Zone using only the information referred to above.

In case of distributed scheduling the Sync Info should preferably include additional data that will enable the BSs within the MBS_Zone to schedule and transmit the same data at the same location in the DL frame. That can be done for example by using one of the following two approaches:

A semi-synchronized approach where all BSs have a set of schedulers; and

A full-unsynchronized approach where there is no a priori knowledge on the schedulers implemented in the BSs.

In the semi-synchronized approach, each of the BSs holds the same set of schedulers. Therefore, the synchronization information should enable the participating BSs to be aware of the fragmentation and packing rules, which scheduler they should use, and if needed with which scheduler's parameters. For example, in case of Round-Robin scheduling, the additional information can include the order of connections, and the deficit counter, etc.

In the full-unsynchronized approach, a BS does not have any a priori knowledge on the schedulers implemented in other BSs. Therefore the synchronizing node should distribute the information that will enable the participating BSs to schedule the connection in a synchronized manner.

The synchronizing node should preferably distribute the following information:

The allocation of the MBS Bursts across the air frames of the Transmission Period (see FIG. 5) Order of bursts;

Information allowing the BSs to build identical PDUs (e.g., fragmentation, packing, first FSN, etc.).

Let us take now an example where the Sync Node distributes the MBS_MAP and the relevant IEs. The distribution of data can either be through dedicated messages or piggybacked with the data. For example, in the aforementioned example, the MAP can be sent in a single message and the IEs can be piggybacked with the data of the relevant connection.

The overheads associated with the synchronization can be reduced and moreover the method can be further improved by using the information in a periodic manner. In other words, the same MBS_Zone structure in the DL frame will be used in future MBS transmissions in a certain pattern. For this purpose the information should preferably also include:

Number of frames between transmissions (of the same structure); and

Figure 5:
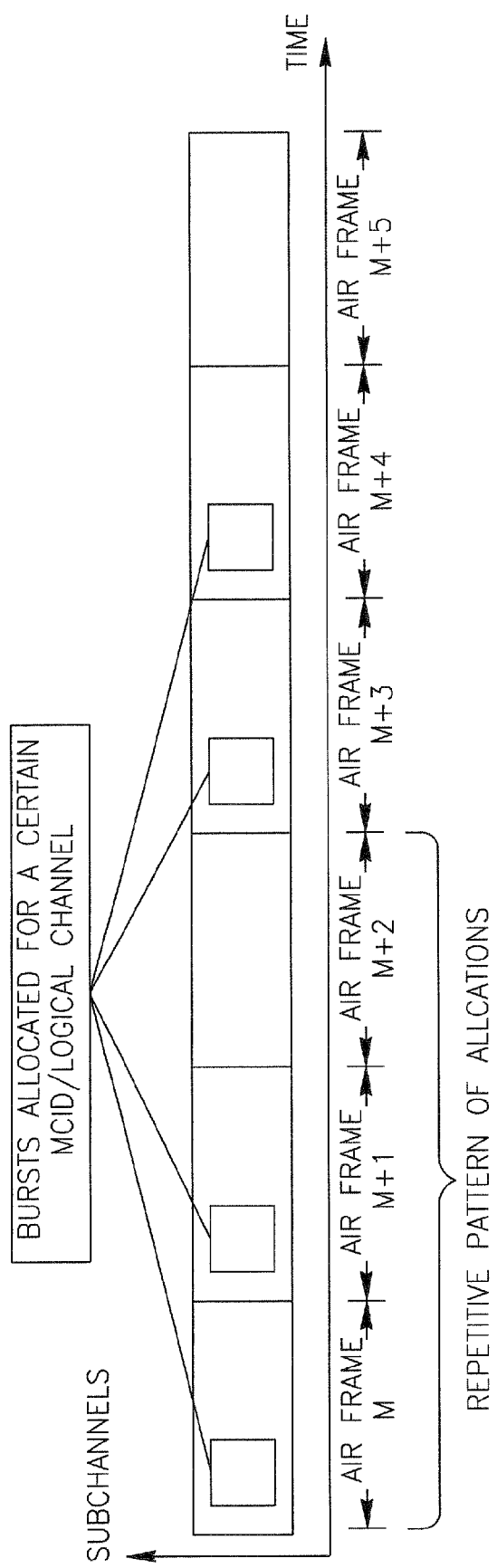
FIG. 5—shows an example of MBS bursts allocations for accumulated data.
Figure 6:
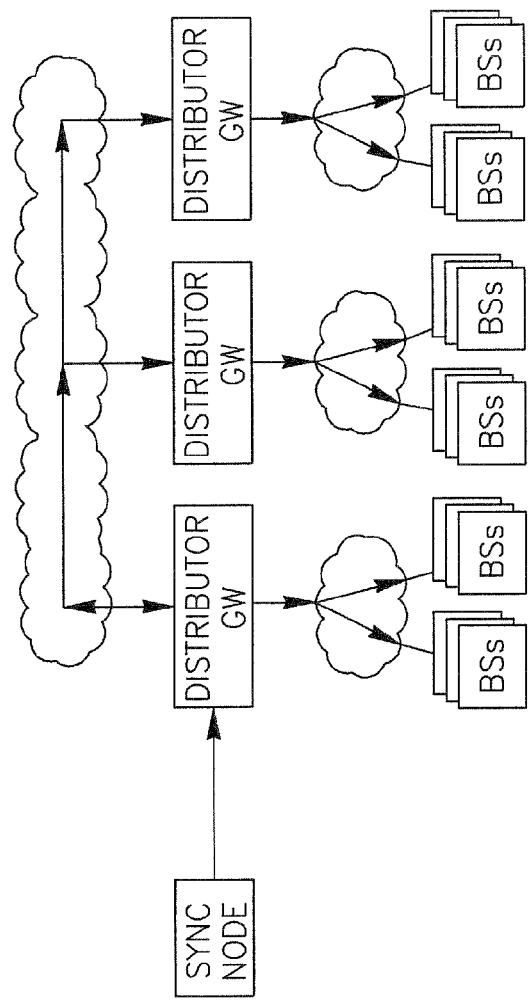
FIG. 6—presents a schematic view of multicasting synchronization information.

Number of times the same MBS Zone is transmitted (see FIG. 5).

When the transmission of the MBS_Zone is completed, the BSs start using the new synchronization information.

Lost Content Recovery

In order to achieve transmission synchronization, the data available at every BS participating in the MBS at the beginning of the transmission period must be identical. If some BSs miss some data then as explained above the BSs must recover either the data themselves or, at least, the lengths of the missing packets. A BS may detect data loss by examining the sequence numbers in the contiguous stream of packets having the same GRE Key and by comparing the received sequence numbers with those specified in the Sync Info packet.

Next, once the BS establishes that certain data has been lost, in order to recover that lost data within the realm of a single Distributor GW the following method may be used:

A BS that discovers data loss sends a Recovery Request message to the Distributor GW. The message contains the GRE Key associated with the Multicast Flow (or alternatively the Global Multicast Flow Identifier) and a list of Sequence Numbers of the missing packets.

The Distributor GW responds to the Recovery request message by sending a Recovery Response message. The latter message contains the GRE Key associated with the Multicast Flow (or alternatively the Global Multicast Flow Identifier) and a list of Sequence Numbers of the missing packets together with their corresponding lengths. Optionally or in the alternative, the packets themselves are retransmitted over the unicast or multicast GRE tunnels associated with the Multicast Flow.

The above described recovery mechanism may be augmented by several other methods to recover data:

Additional encoding to recover lost and damaged packets;

Additional data (e.g., sequence and size) on consecutive packets attached to every packet distributed in the Mcast tree; and Distribution of metadata (e.g., sequence and size) over the Mcast tree or another tree dedicated for recovery using standalone packets.

Synchronizing of Overlapping MBS Zones

In accordance with another embodiment of the present invention, there is provided a solution to the problem of synchronizing MBS_Zones which may overlap with each other to some extent or another.

Figure 7:
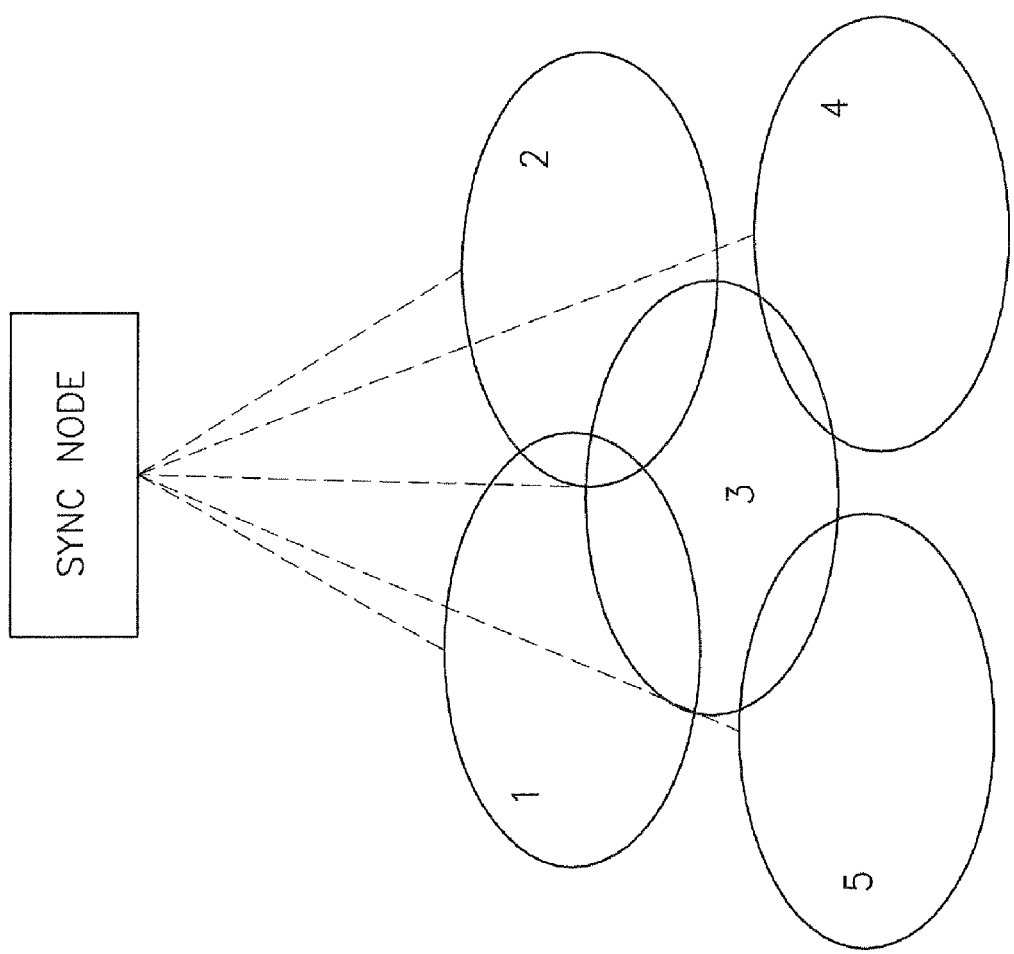
FIGS. 7, 7A and 7B—show schematic representations of a multi MBS zones network with partial overlapping.
Figure 7A:
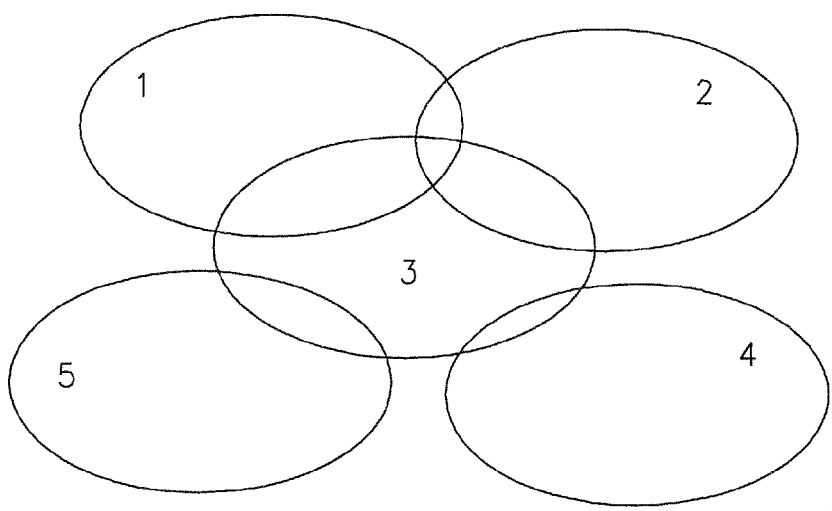
Figure 7B:
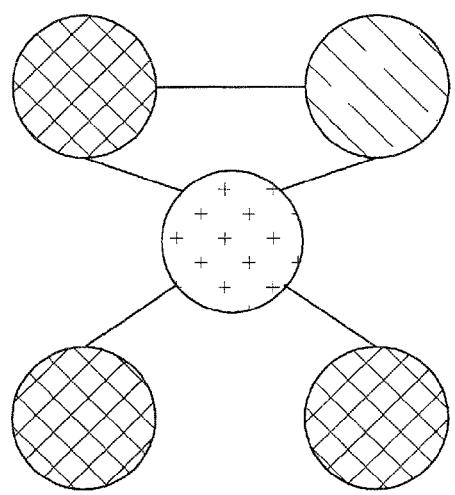

Let us consider FIG. 7 which demonstrates a system having some overlap in the MBS_Zones associated therewith, whereby each of the zones 1, 2, 4 and 5 partially overlap zone 3, and 1 and 2 also partially overlap each other. FIG. 7A presents schematically the geographical overlapping of the zones, whereas FIG. 7B shows a graphical representation of these zones as the first step of the solution suggested.

Graph vertex coloring algorithm has been selected as the proposed mechanism, and the following example is used to demonstrate how the algorithm can be used to solve the problem of Inter MBS Zone Synchronization.

A set of overlapping MBS Zones may be modeled as a graph in which vertices represent the MBS Zones, and edges defines the relations between the vertices (zones). If two MBS Zones overlap geographically, an edge is drawn between the corresponding vertices. In order to color the graph, i.e., creating a vertex colored graph, different colors are assigned to the vertices such that no two adjacent vertices share the same color. Such a resulting graph with different notations designating different colors is illustrated on 7B.

Using Graph Coloring for Scheduling

The color assigned to each zone is interpreted as follows: all MBS Zones to which the same color has been assigned, may transmit their data over the same sub-channels the same time. In other words, the transmission can overlap in both the subchannel and timeslot dimensions, while MBS Zones that have been assigned different colors must not transmit their data over the same subcarriers at the same time.

Figure 8:
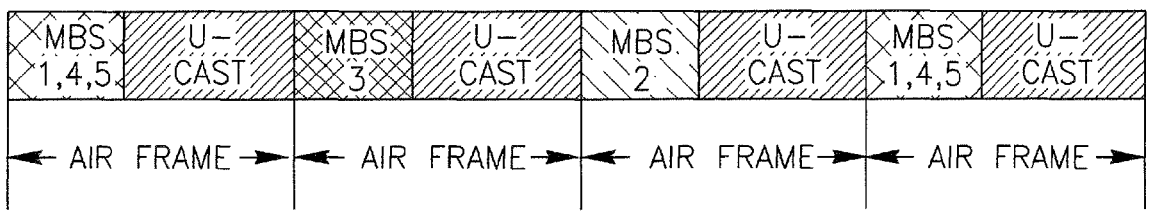
FIG. 8—illustrates use of coloring method for scheduling MBS transmission in the network of FIG. 7.
Figure 10:
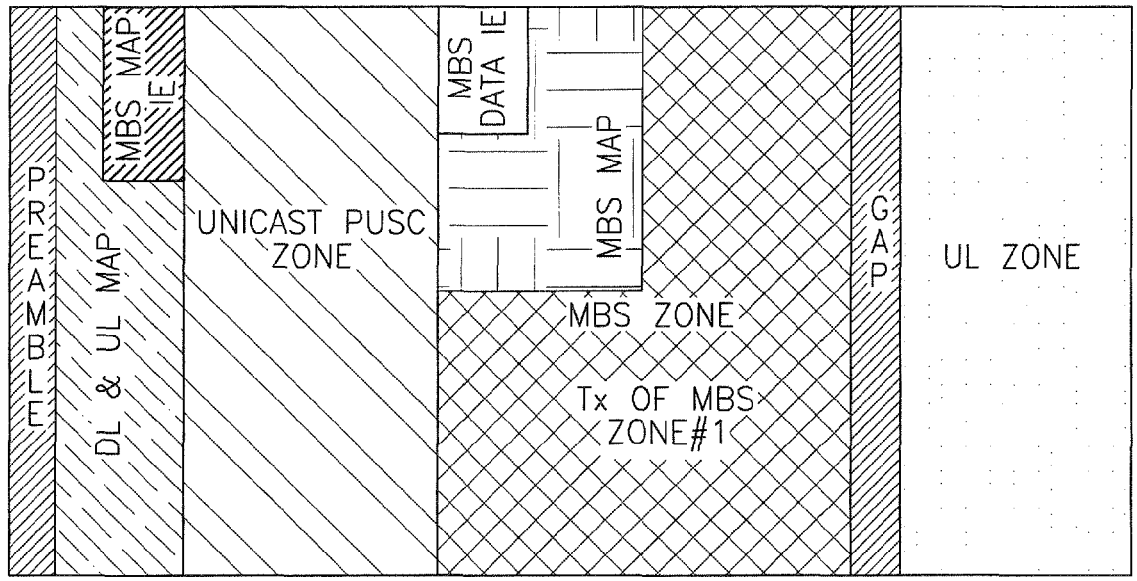
FIG. 10—illustrates transmission of a single MBS zone within a frame.

Practically, it means that each color is assigned time×subchannels regions in which the related MBS Zones (the ones having the same color) may transmit their data. FIG. 8 shows an example of such arrangement. In this example, MBS Zones 1, 4 and 5 transmit in one of the regions, MBS Zone 2 transmits in another regions, while MBS Zone 5 transmits in yet another region. The MBS Zones topology and the corresponding colored graph are depicted in FIGS. 7A and 7B. FIG. 10 depicts the transmission of multicast connections of only one of the MBS zones within a frame. Obviously, in this example, the same frequency and time resources may be utilized in zones 4 and 5 (the zones that do not overlap with zone 1).

FIG. 8 illustrates a scenario where each airframe is assigned to exactly one single colored region. In the general case some airframes may have no colored regions at all (which means no MBS transmission has been scheduled for these frames). In addition, it is also possible to have more than one colored region in the same airframe.

Figure 9:
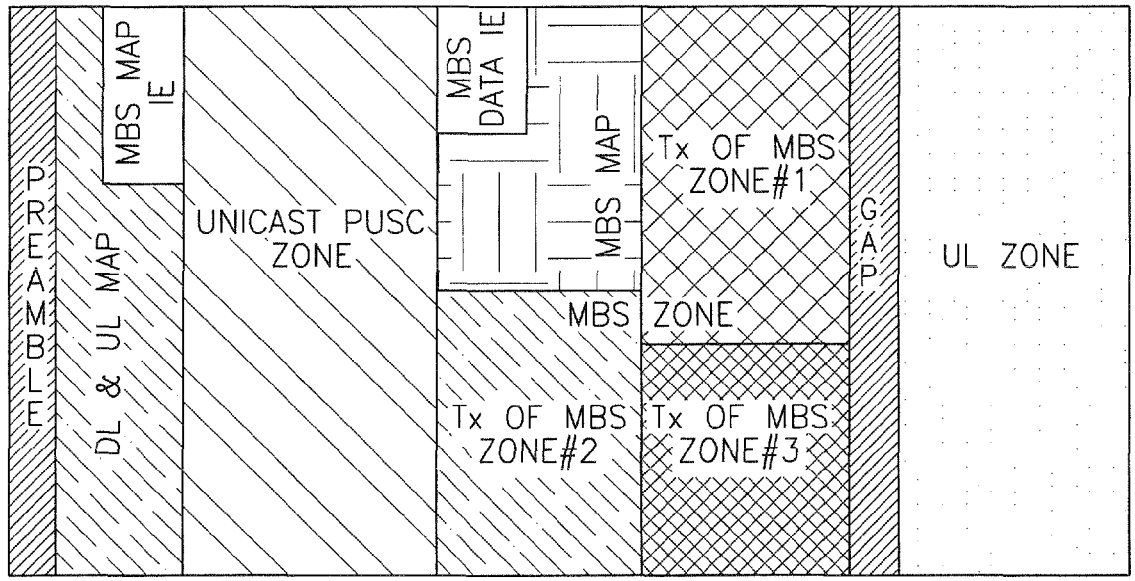
FIG. 9—illustrates transmissions of several MBS zones within a single frame.

FIG. 9 illustrates the transmission of multicast connections of three MBS zones in a single frame. In this case the transmissions are totally separated (either in the frequency domain or time wise) to avoid interference. In this example, the same frequency and time resources may be utilized in zones 4 and 5 as in zone 1.

Off-Line (Static) Graph Coloring

Vertex coloring of a graph that models the MBS Zones topology may be calculated off-line and the resulting colored regions may be manually configured in the corresponding Base Stations. In this case the radio resources for each MBS Zone are pre-assigned. However if at a particular transmission period, a certain MBS Zone may not have enough traffic in order to fill the colored region assigned to it, in which case it may use the remaining resource (i.e. time and subcarriers) for transmitting non-MBS traffic.

This approach would not require exchanging any information across the network while still allowing dynamic resource sharing between the MBS and non-MBS traffic within a specific MBS Zone.

On-Line (Dynamic) Graph Coloring

If the radio resources should be dynamically shared between the MBS Zones for MBS traffic, then the vertex coloring must be dynamically re-calculated so that after each accumulation period and the assignment of resources is re-assigned and the resulting assignment of the colored regions is distributed among all the Base Stations that belong to the corresponding MBS Zones.

In addition to the advantage that can be achieved by using static coloring, i.e. sharing resources with non-MBS connections when there is no traffic, dynamic coloring also allows resource sharing among different MBS zones.

The drawback of this approach is by the complexity of the graph to be colored. If the graph is too complex then the time required for carrying out this coloring method may turn to be too long. However since the MBS Zones are always planned in advance, it may be possible to avoid creating too complex topologies.

Figure 11:
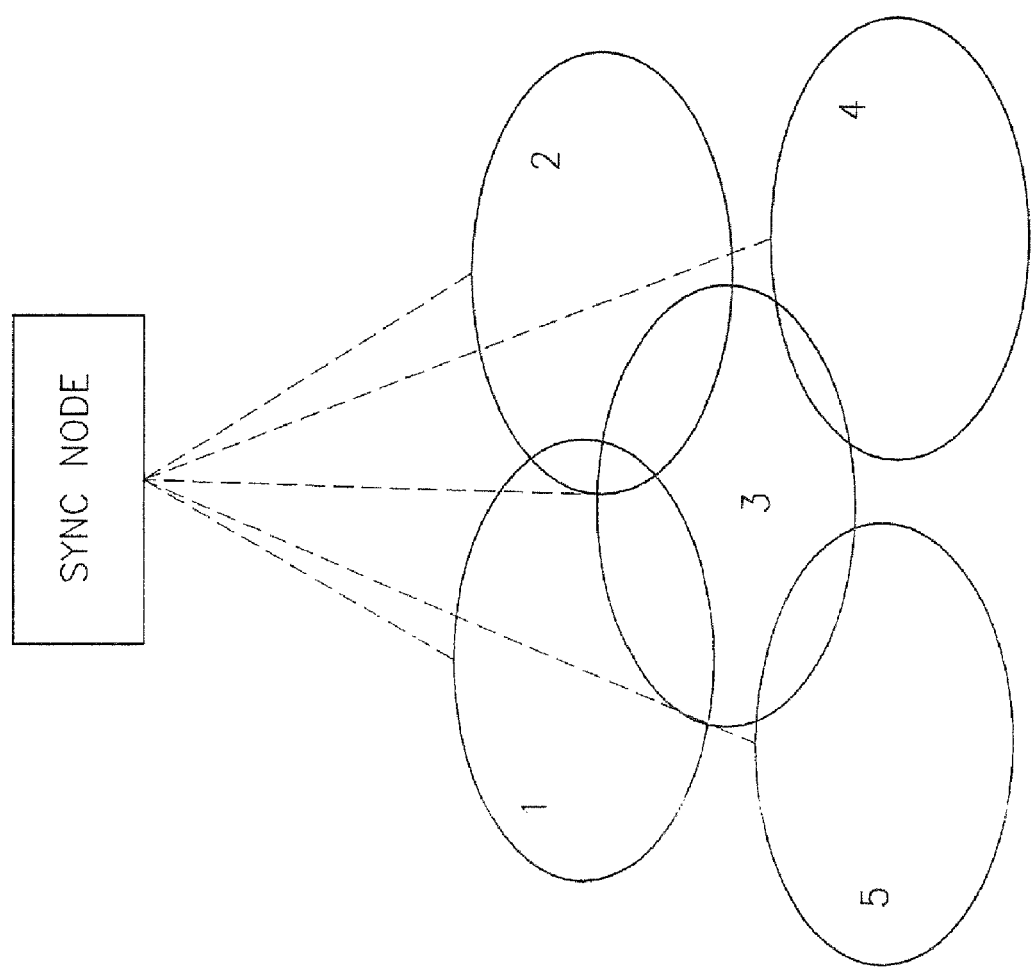
FIG. 11—illustrates the architecture of a single sync node for the network of FIG. 7.

The entity which calculates the graph coloring, should be made aware of the data accumulated for each MBS Zone at the end of each accumulation period. Such an entity can be a Sync Node shared by multiple Zones (see FIG. 11).

It should be noted that it is possible to have a separate Sync Node per each Zone (or per a number of zones being a sub-set of the total number of zone handled). In this case, at the end of each accumulation period the Sync Nodes must exchange information about the amount of traffic accumulated for each Zone. The Sync Node of each such specific zone can then calculate the graph coloring independently and send the assignment of the resulting colored region to its Zone.

As will be appreciated by those skilled in the art, the examples provided show methods and devices for synchronizing multicast/broadcast services in wireless networks. However, similar processes may be applied in a similar way in order to accommodate different network's configurations, without departing from the scope of the present invention.

It is to be understood that the above description only includes some embodiments of the invention and serves for its illustration. Numerous other ways of carrying out the methods provided by the present invention may be devised by a person skilled in the art without departing from the scope of the invention, and are thus encompassed by the present invention.

The invention claimed is:

1. In a wireless communications network comprising a plurality of Base Stations each operative to provide MBS to mobile subscribers, a method for synchronizing the transmission of multicasting/broadcasting services (MBS) data by said plurality of Base Stations comprising the steps of:
   (i) providing a first pre-determined time interval;
   (ii) providing synchronization information to enable all of said plurality of Base Stations to start transmitting MBS data at a synchronized starting time point;
   at each of said plurality of Base Stations:
   (iii) receiving MBS data to be transmitted by all of said plurality of Base Stations;
   (iv) determining whether any of the MBS data has not been properly received, and upon determining the existence of such faulty MBS data, initiating by the respective one or more Base Stations a process to recover said faulty MBS data or to obtain within said first pre-determined time interval, information regarding the duration of a time period that would have been required for transmission of the faulty MBS data;
   (v) for any of the respective one or more Base Stations that has not recovered said faulty MBS data, determining a starting point of a silence period which would proceed the last data that has been properly received at the respective Base Station and the duration of said silence period based on the information obtained by said respective Base Station;
   (vi) transmitting available MBS data, starting at the synchronized starting time point and for the duration of a second pre-determined time interval, and wherein each of said respective one or more Base Stations that has not recovered the faulty MBS data shall refrain during said silence period from transmitting any signals along a communication channel allocated for transmission of MBS data.

2. The method according to claim 1, wherein said first per-determined period of time comprises two substantially equal periods of time, the first of which is intended for carrying out step (iii) while the second for carrying out step (iv).

3. The method according to claim 1, wherein the duration of said first pre-determined period of time is twice as long as the second pre-determined time interval.

4. The method according to claim 1, wherein steps (iii) to (vi) are repeated every interval of time which is equal to the sum of the first pre-determined time interval and the second pre-determined time interval.

5. The method according to claim 1, wherein steps (ii) to (vi) are repeated after receiving synchronization information from a network scheduling means.

6. The method according to claim 1, wherein said synchronization information comprises at least one of the following:
   global multicast flow identification for identifying a respective multicast flow;

timestamp indicating the start of the first pre-determined timeinterval; and sequence numbers of the first and last packets received during the first pre-determined timeinterval;

scheduling rules; and resources allocations.

7. The method according to claim 1, wherein said synchronization information further comprises at least one of the following:

allocation of MBS bursts across air frames of a transmission period;

order of bursts;

information allowing said plurality of Base Stations to construct identical PDUs.

8. The method according to claim 1, wherein the process in step (iv) to recover said faulty MBS data or to obtain information about the time period required for transmission of said faulty MBS data, comprises the steps of:

(a) sending by each of the respective one or more Base Stations a corresponding recovery request message to a distributing gateway which comprises identification of the respective multicast flow and a list of sequence numbers of faulty packets;

(b) receiving from said distributing gateway a recovery response message comprising identification of the respective multicast flow and a list of sequence numbers of the faulty packets together with information relating to their corresponding lengths.

9. The method according to claim 8, wherein said recovery response message further comprising information relating to the data included in one or more of the faulty packets.

10. The method according to claim 1, wherein step (vi) is synchronized with a paging period of respective mobile subscribers so that such mobile subscribers can avoid waking up twice to receive MBS data and paged data during two different time intervals.

11. The method according to claim 1, wherein said wireless communications network comprises a plurality of MBS zones, each comprising at least one Base Station and wherein at least two of said MBS zones geographically overlap each other, and wherein said method further comprising a step of synchronizing all MBS zones that have no overlapping between each other so that they may transmit their data over the same subcarriers at the same time.

12. The method according to claim 11, wherein said step of synchronizing all MBS zones is carried out dynamically so that after each first pre-determined time interval period the network resources are re-assigned and distributed among all Base Stations that belong to the corresponding MBS zones.

13. A base station operative to provide multicasting/broadcasting services (MBS) to mobile subscribers in a wireless communications network, said wireless communications network comprising a plurality of base stations each operative to provide MBS to mobile subscribers, wherein said base station comprises:

a transceiver operative to:

(i) receive synchronization information to enable said base station to start transmitting MBS data at a synchronized starting time point;

(ii) receive MBS data to be transmitted by all of said plurality of base stations;

a processor operative to:

(i) determine whether any of the MBS data has not been properly received, and upon determining the existence of such faulty MBS data, initiating a process to recover said faulty MBS data or to obtain within a first pre-determined time interval information regarding the duration of a time period that would have been required for transmission of the faulty MBS data;

(ii) in case that said faulty MBS data has not been recovered, to determine a starting point of a silence period which would proceed the last data that has been properly received and the duration of said silence period based on the information received by said transceiver;

and wherein said transceiver is further operative to transmit available MBS data, starting at the synchronized starting time point and for the duration of a second pre-determined time interval, and wherein in case the faulty MBS data has not recovered, to refrain from transmitting any signals along a communication channel allocated for transmission of MBS data during said silence period.

14. The base station according to claim 13, wherein said synchronization information comprises at least one of the following:

global multicast flow identification for identifying a respective multicast flow;

timestamp indicating the start of a time interval during which MBS data shall be received by said plurality of Base Stations and each of said Base Stations may conduct a recovery process in case some or all of the MBS data received thereby is missing; and sequence numbers of the first and last packets received during said time interval.

15. The base station according to claim 13, wherein said synchronization information further comprises information that enables coherent construction and placement of bursts.

* * * * *